United States Patent
Franks et al.

(10) Patent No.: US 8,281,929 B2
(45) Date of Patent: Oct. 9, 2012

(54) PHARMACY LABEL WITH SECURABLE TAB AND SYSTEMS ASSOCIATED THEREWITH

(75) Inventors: Matthew P. Franks, Austin, TX (US); James A. Wilson, Golden Valley, MN (US)

(73) Assignee: Target Brands, Inc., Minneapolis, MN (US)

( * ) Notice: Subject to any disclaimer, the term of this patent is extended or adjusted under 35 U.S.C. 154(b) by 289 days.

(21) Appl. No.: 12/874,951

(22) Filed: Sep. 2, 2010

(65) Prior Publication Data
US 2011/0155625 A1 Jun. 30, 2011

Related U.S. Application Data

(60) Provisional application No. 61/290,284, filed on Dec. 28, 2009.

(51) Int. Cl.
*B65D 83/04* (2006.01)
*B42D 15/00* (2006.01)

(52) U.S. Cl. ....... 206/534; 40/310; 206/459.5; 206/540; 283/67; 283/900

(58) Field of Classification Search ............... 206/459.1, 206/459.5, 528, 534, 538, 540; 40/310–312; 53/467, 471, 473, 476, 478; 283/54, 60.1, 283/61, 62, 81, 94, 101, 106, 67, 900; 215/365, 215/DIG. 3
See application file for complete search history.

(56) References Cited

U.S. PATENT DOCUMENTS

| | | | |
|---|---|---|---|
| D11,149 S | 4/1879 | Hood | |
| D18,997 S | 4/1889 | Underhill | |
| 406,017 A | 6/1889 | Woodward et al. | |
| 493,851 A | 3/1893 | Adsit | |
| 605,213 A | 6/1898 | Weller | |
| 624,701 A | 5/1899 | Stevenson | |
| 716,793 A | 12/1902 | Vogeler | |
| D45,565 S | 4/1914 | Lloyd | |
| 1,181,098 A | 4/1916 | Lambert | |
| 1,289,218 A | 12/1918 | Maiden | |

(Continued)

FOREIGN PATENT DOCUMENTS

| | | |
|---|---|---|
| DE | 3723671 | 8/1988 |
| DE | 3924790 A1 | 2/1991 |
| EP | 0146095 B1 | 6/1985 |

(Continued)

OTHER PUBLICATIONS

"Multi-Dose, Multi-Color, I.V. Bag Rings," www.medidose.com/catalog/ivpharm/bagrings.html, publicly advertised online at least as early as Apr. 27, 2002 based on the internet archive available at www.archive.org (1 page).

*Primary Examiner* — Luan K Bui
(74) *Attorney, Agent, or Firm* — Griffiths & Seaton PLLC (57) ABSTRACT

A label for a prescription pharmacy bottle includes a panel, a tab, and a flange. The panel defines a first side edge, a second side edge, and an aperture extending through the panel and positioned adjacent the second side edge. The tab extends from the first side edge away from the panel and rotates about the first side edge to selectively move between a first position, in which the tab substantially covers the panel, and a second position, in which the tab extends away from the panel. The flange is initially formed to extend from the second side edge away from the panel and defines a substantially planar surface coated with an adhesive. The flange is folded about the second side edge to extend behind the panel such that the adhesive on the flange extends across and is exposed through the aperture. Other labels, combinations, and methods are also disclosed.

27 Claims, 8 Drawing Sheets

U.S. PATENT DOCUMENTS

| | | | |
|---|---|---|---|
| 1,411,510 A | 4/1922 | Peterson | |
| 1,554,191 A | 9/1925 | Alexander | |
| 1,653,608 A | 12/1927 | Allen | |
| 1,686,354 A | 10/1928 | Wallace | |
| 1,756,944 A | 5/1930 | Gorton, Jr. | |
| 1,769,147 A | 7/1930 | Lennon | |
| 1,815,268 A | 7/1931 | Newbery | |
| 1,850,369 A | 3/1932 | Andrews | |
| 1,949,903 A | 3/1934 | Fales | |
| 1,991,871 A | 2/1935 | Sindler | |
| 1,993,978 A | 3/1935 | Plochman | |
| 1,999,878 A | 4/1935 | La Bombard | |
| 2,007,685 A | 7/1935 | Lyle | |
| 2,110,768 A | 3/1938 | Kellogg | |
| 2,194,220 A | 3/1940 | Elder | |
| D128,282 S | 3/1941 | Gelinas et al. | |
| 2,270,277 A | 1/1942 | Dowd | |
| D132,185 S | 4/1942 | Mcintosh | |
| 2,328,806 A | 9/1943 | Hoofer | |
| 2,528,259 A | 10/1950 | Annuziata | |
| 2,659,614 A | 11/1953 | Cook et al. | |
| 2,706,865 A | 4/1955 | Miller | |
| 2,794,545 A | 6/1957 | Olson | |
| 2,844,893 A | 7/1958 | Keller | |
| 2,847,971 A | 8/1958 | Painter | |
| 2,908,985 A | 10/1959 | Hartman | |
| 2,920,777 A | 1/1960 | Cole | |
| 2,961,108 A | 11/1960 | Johnson | |
| 2,995,265 A | 8/1961 | Soderberg | |
| 3,077,684 A | 2/1963 | Gwinn | |
| 3,256,978 A | 6/1966 | Srigley et al. | |
| 3,298,671 A | 1/1967 | Popma et al. | |
| 3,331,521 A | 7/1967 | Paige | |
| 3,423,861 A | 1/1969 | Forsyth | |
| 3,433,378 A | 3/1969 | Ross | |
| 3,437,194 A | 4/1969 | Ames et al. | |
| 3,625,547 A | 12/1971 | Burke | |
| 3,628,266 A | 12/1971 | Wise | |
| 3,757,994 A | 9/1973 | Skoetsch | |
| D230,137 S | 1/1974 | Bettonica | |
| 3,787,993 A | 1/1974 | Lyon | |
| 3,822,780 A | 7/1974 | Ulmer et al. | |
| 3,826,222 A | 7/1974 | Romick | |
| 3,850,326 A | 11/1974 | Ryles | |
| 3,923,180 A | 12/1975 | Fields | |
| 3,996,879 A | 12/1976 | Walton | |
| 4,022,352 A | 5/1977 | Pehr | |
| 4,044,889 A | 8/1977 | Orentreich et al. | |
| 4,064,645 A | 12/1977 | Wood | |
| RE29,793 E | 10/1978 | Pehr | |
| 4,143,786 A | 3/1979 | Goldberg et al. | |
| 4,150,760 A | 4/1979 | d'Orgelys | |
| D255,054 S | 5/1980 | Kingsford | |
| 4,246,709 A | 1/1981 | Selleslags | |
| 4,263,734 A | 4/1981 | Bradshaw | |
| 4,284,200 A | 8/1981 | Bush et al. | |
| 4,285,489 A | 8/1981 | Blanchard | |
| 4,312,523 A | 1/1982 | Haines | |
| 4,324,058 A | 4/1982 | Sherwick et al. | |
| 4,334,638 A | 6/1982 | Stock | |
| D270,998 S | 10/1983 | Stark | |
| D274,309 S | 6/1984 | Aldrich, III | |
| 4,535,903 A | 8/1985 | Franchi | |
| D280,601 S | 9/1985 | Biesecker | |
| D282,909 S | 3/1986 | Biesecker | |
| D285,535 S | 9/1986 | Buchholz et al. | |
| 4,621,837 A | 11/1986 | Mack | |
| 4,732,411 A | 3/1988 | Siegel | |
| D295,024 S | 4/1988 | Trick | |
| D295,954 S | 5/1988 | Kirchhoff | |
| 4,799,712 A | 1/1989 | Biava et al. | |
| D300,119 S | 3/1989 | Pacquin | |
| 4,813,570 A | 3/1989 | Pontoppidan | |
| 4,819,351 A | 4/1989 | Boitani | |
| 4,850,613 A | 7/1989 | Instance | |
| 4,860,899 A | 8/1989 | McKee | |
| 4,863,026 A | 9/1989 | Perkowski | |
| 4,868,027 A | 9/1989 | Hunkeler et al. | |
| 4,881,648 A | 11/1989 | Hagerty | |
| 4,883,180 A | 11/1989 | Humphrey et al. | |
| 4,884,827 A | 12/1989 | Kelley | |
| D305,505 S | 1/1990 | Kunesh | |
| 4,890,742 A | 1/1990 | Allison | |
| 4,913,083 A | 4/1990 | Valvo et al. | |
| 4,918,604 A | 4/1990 | Baum | |
| 4,919,285 A | 4/1990 | Roof et al. | |
| 4,941,573 A | 7/1990 | Fuerstman | |
| 4,972,657 A | 11/1990 | McKee | |
| D312,776 S | 12/1990 | Tacconelli | |
| 4,991,877 A | 2/1991 | Lieberman | |
| 5,011,032 A | 4/1991 | Rollman | |
| 5,020,682 A | 6/1991 | Dutt | |
| D319,181 S | 8/1991 | Balavich | |
| 5,048,870 A * | 9/1991 | Mangini et al. ................. 283/81 |
| 5,056,827 A | 10/1991 | Sasso | |
| D323,780 S | 2/1992 | Addante | |
| D324,994 S | 3/1992 | Jentgen | |
| 5,102,169 A | 4/1992 | Mayfield | |
| D328,246 S | 7/1992 | Nottingham et al. | |
| 5,145,080 A | 9/1992 | Imbery, Jr. | |
| 5,165,546 A | 11/1992 | Jaeger et al. | |
| 5,172,936 A | 12/1992 | Sullivan et al. | |
| 5,178,311 A | 1/1993 | McBride | |
| D333,618 S | 3/1993 | Patel et al. | |
| 5,193,032 A | 3/1993 | Hirth | |
| 5,204,775 A | 4/1993 | McDevitt | |
| 5,207,746 A | 5/1993 | Jones | |
| 5,215,334 A | 6/1993 | Presson et al. | |
| RE34,366 E | 9/1993 | Instance | |
| 5,261,702 A | 11/1993 | Mayfield | |
| D342,452 S | 12/1993 | Monaghan | |
| D343,360 S | 1/1994 | Poo | |
| 5,284,363 A | 2/1994 | Gartner et al. | |
| 5,301,802 A | 4/1994 | Nemeroff | |
| 5,301,840 A | 4/1994 | Sun | |
| 5,309,279 A | 5/1994 | Halstead | |
| 5,342,093 A | 8/1994 | Weernink | |
| D350,691 S | 9/1994 | Simion | |
| 5,343,647 A | 9/1994 | Bulka | |
| 5,346,069 A | 9/1994 | Intini | |
| D351,796 S | 10/1994 | Deddens | |
| 5,351,991 A | 10/1994 | McDonald | |
| D355,125 S | 2/1995 | Patel et al. | |
| D355,126 S | 2/1995 | Paulovich et al. | |
| D355,363 S | 2/1995 | Iorii et al. | |
| 5,386,795 A | 2/1995 | Bartholomew | |
| 5,403,636 A | 4/1995 | Crum | |
| D360,134 S | 7/1995 | Snyder | |
| 5,448,844 A | 9/1995 | Miller, Jr. et al. | |
| 5,472,756 A | 12/1995 | Sechet | |
| 5,476,420 A | 12/1995 | Manning | |
| 5,495,944 A | 3/1996 | Lermer | |
| D370,636 S | 6/1996 | Crawford | |
| 5,588,239 A | 12/1996 | Anderson | |
| 5,601,314 A | 2/1997 | Burns et al. | |
| 5,632,420 A | 5/1997 | Lohrman et al. | |
| 5,642,906 A | 7/1997 | Foote et al. | |
| 5,645,300 A | 7/1997 | Hill | |
| 5,660,138 A | 8/1997 | Hirsch | |
| 5,662,239 A | 9/1997 | Heuvelman | |
| 5,676,401 A | 10/1997 | Witkowski et al. | |
| D389,064 S | 1/1998 | Sethi et al. | |
| 5,704,144 A | 1/1998 | Groth | |
| 5,704,648 A | 1/1998 | Brown et al. | |
| 5,713,681 A | 2/1998 | Venne et al. | |
| 5,718,347 A | 2/1998 | Walker et al. | |
| 5,719,828 A | 2/1998 | Haas et al. | |
| 5,727,819 A | 3/1998 | Grosskopf et al. | |
| 5,729,922 A | 3/1998 | Peterson et al. | |
| 5,730,292 A | 3/1998 | Jones | |
| 5,752,723 A | 5/1998 | Robertson | |
| 5,758,440 A | 6/1998 | Yudin | |
| 5,760,975 A | 6/1998 | DiGiovanni | |
| D395,828 S | 7/1998 | Lecoule | |
| 5,779,072 A | 7/1998 | Krebs | |
| 5,788,974 A | 8/1998 | D'Amico et al. | |
| 5,799,815 A | 9/1998 | Lang | |

| | | |
|---|---|---|
| 5,800,144 A | 9/1998 | Glenn et al. |
| 5,829,789 A | 11/1998 | Treleaven et al. |
| 5,887,736 A | 3/1999 | Mar |
| 5,905,652 A | 5/1999 | Kutsuma |
| 5,918,758 A | 7/1999 | Galton-Fenzi |
| D413,067 S | 8/1999 | Haley |
| 5,951,076 A | 9/1999 | Marco |
| 5,960,947 A | 10/1999 | Dimelis et al. |
| 5,980,352 A | 11/1999 | Rigberg |
| 6,003,902 A | 12/1999 | Petkovsek |
| D419,077 S | 1/2000 | Sultan |
| 6,023,865 A | 2/2000 | Preuss |
| 6,036,017 A | 3/2000 | Bayliss, IV |
| D423,361 S | 4/2000 | Negre |
| D425,427 S | 5/2000 | Heeter et al. |
| 6,068,300 A | 5/2000 | Vijuk et al. |
| D427,073 S | 6/2000 | Gaffney et al. |
| 6,081,392 A | 6/2000 | Pensmith |
| 6,086,702 A | 7/2000 | Rea |
| D430,802 S | 9/2000 | Adachi et al. |
| 6,125,563 A | 10/2000 | Girerd |
| 6,127,013 A | 10/2000 | Todd |
| 6,158,779 A | 12/2000 | Petrick |
| 6,162,158 A | 12/2000 | Mercer et al. |
| 6,196,593 B1 | 3/2001 | Petrick et al. |
| 6,209,921 B1 | 4/2001 | Hogan et al. |
| 6,220,439 B1 | 4/2001 | Virvo |
| 6,226,564 B1 | 5/2001 | Stuart |
| 6,241,844 B1 | 6/2001 | Petkovsek |
| D445,338 S | 7/2001 | Helleu |
| 6,270,121 B1 | 8/2001 | Dolan et al. |
| 6,276,725 B1 | 8/2001 | Laurash et al. |
| 6,278,545 B1 | 8/2001 | Napier |
| D447,694 S | 9/2001 | Leggett |
| D451,809 S | 12/2001 | Jones |
| 6,360,462 B1 | 3/2002 | Mengel |
| D456,271 S | 4/2002 | Maloney |
| 6,366,401 B1 | 4/2002 | Gonda et al. |
| 6,367,639 B1 | 4/2002 | Mar |
| 6,367,640 B1 | 4/2002 | Julian |
| 6,379,007 B1 | 4/2002 | Farb |
| D457,063 S | 5/2002 | Bakic |
| 6,386,367 B1 | 5/2002 | Bayliss, IV |
| D459,212 S | 6/2002 | Gobe |
| 6,402,872 B1 | 6/2002 | Key |
| 6,491,164 B1 | 12/2002 | Virvo |
| D470,415 S | 2/2003 | Weber |
| 6,549,345 B1 | 4/2003 | Cardarelli |
| 6,550,171 B1 | 4/2003 | De Werra et al. |
| D474,690 S | 5/2003 | Bakic |
| 6,568,530 B2 | 5/2003 | Takahashi et al. |
| 6,594,928 B1 | 7/2003 | Clawson et al. |
| D480,002 S | 9/2003 | Canepa |
| D480,005 S | 9/2003 | Conway |
| 6,613,410 B1 | 9/2003 | Sellars |
| 6,621,629 B2 | 9/2003 | Blumenthal et al. |
| D480,960 S | 10/2003 | Gray et al. |
| D481,165 S | 10/2003 | Angeletta |
| 6,669,804 B2 | 12/2003 | Pendry et al. |
| D485,764 S | 1/2004 | Bakic |
| 6,681,945 B1 | 1/2004 | Harrold |
| 6,712,398 B1 | 3/2004 | Fox et al. |
| 6,722,495 B2 | 4/2004 | Fresnel |
| 6,733,855 B1 | 5/2004 | Scott |
| 6,745,505 B2 | 6/2004 | Moran |
| 6,752,272 B2 | 6/2004 | Jones et al. |
| 6,789,497 B1 | 9/2004 | Aiken |
| D497,311 S | 10/2004 | Walsh et al. |
| 6,857,801 B2 | 2/2005 | Van Bever |
| 6,860,390 B2 | 3/2005 | Bowman |
| 6,860,513 B2 | 3/2005 | Kaufman |
| 6,868,627 B2 | 3/2005 | Elias |
| 6,923,376 B2 | 8/2005 | Gosden et al. |
| 6,951,353 B2 | 10/2005 | Kozlowski et al. |
| 6,964,345 B2 | 11/2005 | Wetherell, Jr. et al. |
| D520,365 S | 5/2006 | Andoh |
| D522,867 S | 6/2006 | Bakic |
| 7,061,831 B2 | 6/2006 | De La Huerga |
| D526,569 S | 8/2006 | Wurster et al. |

| | | | |
|---|---|---|---|
| D537,349 S | 2/2007 | Ball et al. | |
| D539,651 S | 4/2007 | Snyder | |
| D540,179 S | 4/2007 | Adler et al. | |
| D540,690 S | 4/2007 | Adler et al. | |
| D541,159 S | 4/2007 | Robinson | |
| D542,661 S | 5/2007 | Adler et al. | |
| 7,222,736 B1 | 5/2007 | Seijas | |
| 7,225,052 B2 | 5/2007 | Foote et al. | |
| 7,225,937 B2 | 6/2007 | Schroeder | |
| D550,571 S | 9/2007 | Diaz | |
| D554,999 S | 11/2007 | Nukuto et al. | |
| D555,498 S | 11/2007 | Bansal | |
| 7,311,205 B2 | 12/2007 | Adler et al. | |
| D559,117 S | 1/2008 | Nukuto et al. | |
| 7,320,483 B2 | 1/2008 | Eippert | |
| D566,330 S | 4/2008 | Angeletta | |
| D572,593 S | 7/2008 | Adler et al. | |
| 7,398,999 B2 | 7/2008 | Kaufman | |
| D574,717 S | 8/2008 | Adler et al. | |
| 7,413,082 B2 | 8/2008 | Adler et al. | |
| D583,242 S | 12/2008 | Adler et al. | |
| D594,336 S | 6/2009 | Adler | |
| D597,841 S | 8/2009 | Adler et al. | |
| 7,628,427 B2 | 12/2009 | Adler et al. | |
| 7,661,533 B2 | 2/2010 | Adler et al. | |
| 7,942,451 B2 * | 5/2011 | Adler | 283/81 |
| 7,980,391 B2 * | 7/2011 | Adler et al. | 206/534 |
| 8,056,724 B2 * | 11/2011 | Estep | 206/534 |
| 8,210,351 B2 * | 7/2012 | Miceli et al. | 206/459.5 |
| 2001/0017817 A1 | 8/2001 | De La Huerga | |
| 2002/0020088 A1 | 2/2002 | Kreutner | |
| 2002/0041091 A1 | 4/2002 | Eippert | |
| 2002/0063739 A1 | 5/2002 | Gosden et al. | |
| 2002/0088732 A1 | 7/2002 | Takahashi et al. | |
| 2002/0129758 A1 | 9/2002 | Hanley et al. | |
| 2002/0162261 A1 | 11/2002 | West et al. | |
| 2002/0171238 A1 | 11/2002 | Kozlowski et al. | |
| 2003/0025320 A1 | 2/2003 | Shoemaker | |
| 2003/0028392 A1 | 2/2003 | Davies | |
| 2003/0091687 A1 | 5/2003 | Copelan | |
| 2003/0127351 A1 | 7/2003 | Takahashi et al. | |
| 2003/0147450 A1 | 8/2003 | Witonsky et al. | |
| 2003/0192211 A1 | 10/2003 | Elias | |
| 2003/0193181 A1 | 10/2003 | Hung | |
| 2003/0193185 A1 | 10/2003 | Valley et al. | |
| 2003/0205897 A1 | 11/2003 | Kaufman | |
| 2003/0214129 A1 | 11/2003 | Adler | |
| 2004/0007557 A1 | 1/2004 | Maliszewski et al. | |
| 2004/0033099 A1 | 2/2004 | Van Bever | |
| 2004/0045863 A1 | 3/2004 | Rhoades | |
| 2004/0050750 A1 | 3/2004 | Hannan et al. | |
| 2004/0056479 A1 | 3/2004 | Fox et al. | |
| 2004/0075272 A1 | 4/2004 | Kaufman | |
| 2004/0193454 A1 | 9/2004 | Foote et al. | |
| 2004/0232023 A1 | 11/2004 | Bansal et al. | |
| 2004/0237311 A1 | 12/2004 | Brown et al. | |
| 2006/0163103 A1 | 7/2006 | Adler et al. | |
| 2006/0163869 A1 | 7/2006 | Adler et al. | |
| 2007/0029788 A1 | 2/2007 | Adler et al. | |
| 2007/0063506 A1 * | 3/2007 | Sellars | 283/81 |
| 2007/0102316 A1 | 5/2007 | Van Der Krogt et al. | |
| 2008/0017602 A1 | 1/2008 | Adler et al. | |
| 2009/0140513 A1 * | 6/2009 | Priebe et al. | 283/81 |

FOREIGN PATENT DOCUMENTS

| | | |
|---|---|---|
| EP | 0316636 A2 | 5/1989 |
| EP | 0609955 B1 | 4/1998 |
| EP | 0609954 B1 | 7/1998 |
| EP | 0924676 A2 | 6/1999 |
| EP | 1369252 A2 | 12/2003 |
| FR | 1043230 A | 11/1953 |
| FR | 2296391 A1 | 7/1976 |
| GB | 2006713 A | 5/1979 |
| GB | 2277075 A | 6/1994 |
| JP | 10297640 | 11/1998 |
| WO | 03098275 A2 | 11/2003 |
| WO | 2004048216 A1 | 6/2004 |

* cited by examiner

PHARMACY LABEL WITH SECURABLE TAB AND SYSTEMS ASSOCIATED THEREWITH

CROSS-REFERENCE TO RELATED APPLICATION

This non-provisional application claims the benefit under 35 U.S.C. §119(e) of U.S. Provisional Application No. 61/290,284, filed Dec. 28, 2009, which is incorporated herein by reference.

BACKGROUND OF THE INVENTION

Virtually everyone consumes prescription pharmaceuticals at one time or another. In each instance, the consumer is faced with a series of procedural steps and information. The procedural steps include submitting the prescription, waiting for it, picking up the prescription, and signing applicable notices. In some cases, the prescription is modified to satisfy the demands of the patient's insurance company. A large volume of information about the patient, pharmacy, physician, and drug is provided on the prescription sticker on the bottle, juxtaposed with numerous warning or cautionary labels haphazardly placed on the bottle. Additional information is provided on one or more printed, folded sheets, which are included with the prescription bottle.

Faced with this relatively chaotic presentation of seemingly obscure facts and requests, consumers can easily misunderstand many aspects related to their prescription. This situation is compounded when a consumer takes several prescriptions and/or when several members of the household each have one or more prescriptions, causing the multiple instructions and warnings to become overwhelming. Reduced vision also is a problem since distinguishing between multiple similar bottles requires very close inspection of the already confusing combination of the warnings and prescription label.

SUMMARY

One embodiment of the invention relates to a label including a panel, a tab, and a flange. The panel defines a first side edge, a second side edge opposite the first side edge, and an aperture extending through the panel and positioned adjacent the second side edge. The tab extends from the first side edge away from the panel and is configured to rotate about the first side edge to selectively move between a first position, in which the tab substantially covers the panel, and a second position, in which the tab extends away from the panel. The flange is initially formed to extend from the second side edge away from the panel, and the flange defines a substantially planar surface coated with an adhesive. The flange is folded about the second edge to extend behind the panel such that the adhesive coated on the substantially planar surface of the flange extends across and is exposed through the aperture. In one example, when the tab is in the first position, the tab interacts with the adhesive on the substantially planar surface of the flange that is exposed through the aperture to selectively secure the tab in the first position. Other labels, associated combinations, and associated methods are also disclosed.

BRIEF DESCRIPTION OF THE DRAWINGS

Embodiments of the invention will be described with respect to the figures, in which like reference numerals denote like elements, and in which.

DETAILED DESCRIPTION

In the following detailed description, reference is made to the accompanying drawings, which form a part hereof, and in which is shown by way of illustration specific embodiments in which the invention may be practiced. The following detailed description, therefore, is not to be taken in a limiting sense, and the scope of the present invention is defined by the appended claims.

Embodiments of the invention are directed to a label and label system that significantly enhances a consumer's experience in having a prescription filled at a retail pharmacy and that improves efficiencies in the pharmacy allowing prescriptions to be processed more easily. In one embodiment, a pharmacy system comprises a label, auxiliary printed materials, and/or a bottle. The bottle container is sized and shaped to hold a medication from a prescription, such as pills, syrup, or other forms of medication. The bottle container includes a pair of generally flat, relatively large surfaces on opposite sides of the container for bearing the label, thereby making the label substantially easier to read. The label is configured for placement as a single piece or separate pieces, depending upon the type or size of the bottle container, to cover both of the opposite faces of the bottle container. Each label differentiates between types of information by segregating the different types of information onto different areas of the container and/or onto different areas of the label. Each label additionally includes a tab radially extending from the bottle wherein the label is configured to be selectively adhered in a closed position. The tab provides increased surface area for providing information to the patient and/or other viewers of the label. In one aspect, the arrangement and the location of the different types of information becomes fixed from prescription to prescription, so that a particular type of prescription-related information (e.g., drug name, warnings, patient name) is found at a fixed, dedicated location on the label and/or portion of bottle container each time a consumer fills a prescription. These embodiments and other embodiments of the invention are described and illustrated in greater detail in association with FIGS. 1-11.

Figure 1:
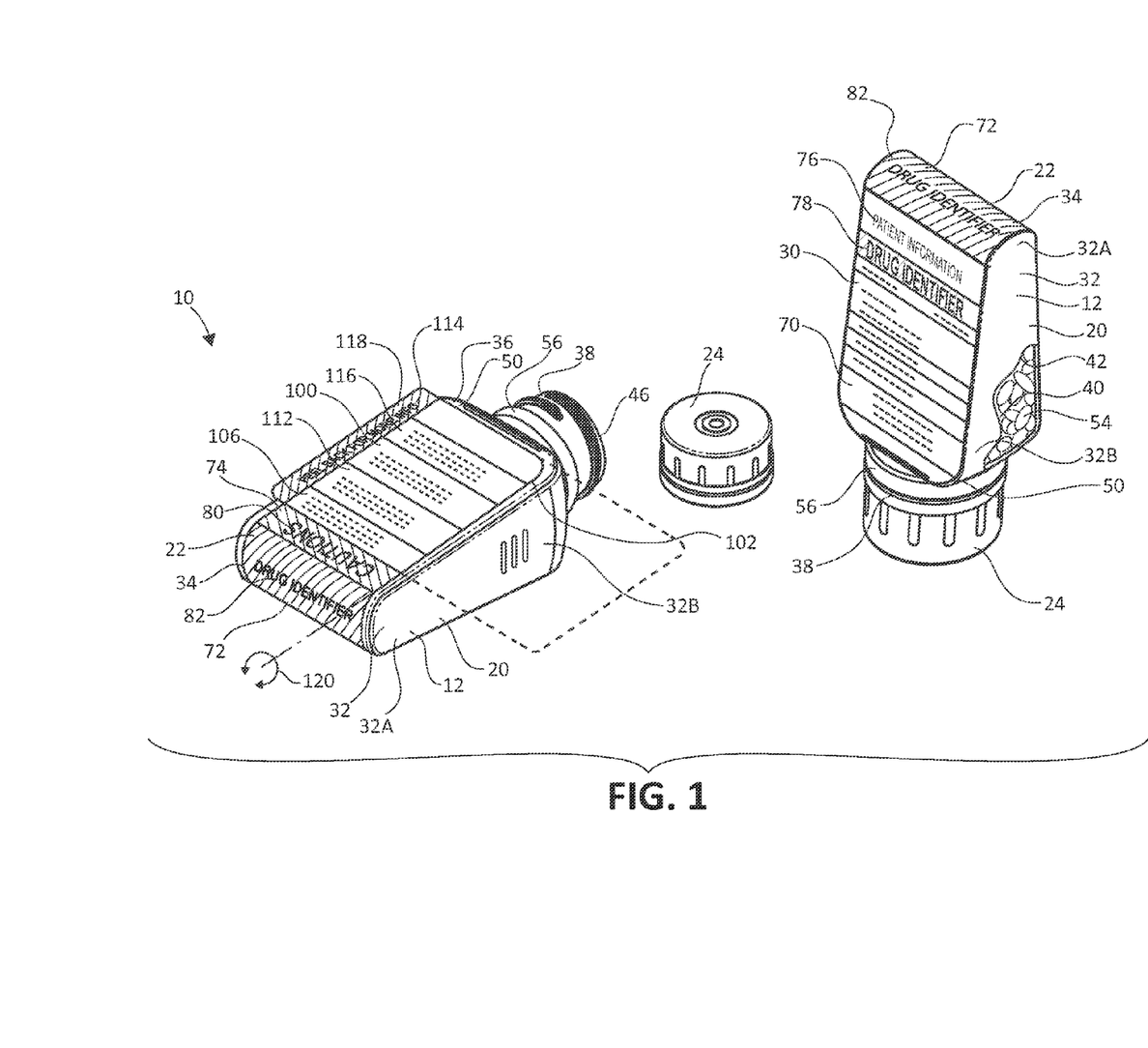
FIG. 1 is a schematic illustration of a pharmacy system including a plurality of bottles with labels, according to one embodiment of the invention.

As shown in FIG. 1, in one embodiment, pharmacy bottle system 10 comprises a plurality of containers or bottles 12. Each bottle 12 comprises a container 20, a label 22, and a cap 24. Container 20 comprises front portion 30, side portions 32, spine portion 34, rear portion 36, and mouth 38 (FIG. 1). Front portion 30 is positioned opposite rear portion 36, and one of side portions 32 extends between front portion 30 and rear portion 36 on either side of container 20 to define a storage chamber 40 (generally shown through a cutout 42 indicated in FIG. 1 for illustrative purposes only) therebetween.

Mouth 38 extends from each of front portion 30, rear portion 36, and side portions 32 at one end of container 20 to form an end of storage chamber 40. In one embodiment, mouth 38 includes a threaded neck 44 (FIG. 1) extending away from a remainder of container 20 with an opening 46 (FIG. 1) providing access through the mouth 38 to storage chamber 40. In one embodiment, threaded neck 44 is configured to threadably receive and engage cap 24 such that cap 24 covers opening 46. Spine portion 34 extends from each of front portion 30, rear portion 36, and side portions 32 at an end of container 20 opposite mouth 38 to form another end of storage chamber 40. As such, storage chamber 40 is completely enclosed other than opening 46. In one embodiment, spine portion 34 of container 20 comprises a slightly curved surface, providing a junction between front portion 30, rear portion 36 and side portions 32.

In one embodiment, bottle 12 stands upright on a support surface 48 (FIG. 3), such as a table or counter, when cap 24 is placed down onto the support surface 48 to cause container 20 to extend upwardly from support surface 48. In this orientation, spine portion 34 is considered a top of bottle 12 while cap 24 (which covers a mouth 38 of bottle 12) is considered a bottom of bottle 12. This right-side-up orientation can also be achieved by manually holding bottle 12 with spine portion 34 in a relatively higher position relative to cap 24 so that label 22 on bottle 12 can be read in an orientation from the spine portion 34 toward cap 24.

In one embodiment, front portion 30 and rear portion 36 of container 20 each define a substantially planar surface 50 that is rectangularly shaped, thereby defining a generally flat, broad surface especially suited for reading information on portions of label 22 applied to substantially planar surfaces 50. For example, substantially planar surfaces 50 enable display of information in a manner in which all of the printed information on each of substantially planar surfaces 50 can be read without turning or rotating bottle 12. In one embodiment, when in the right-side up orientation, front portion 30 and rear portion 36 of container 20 each extend at a slight angle relative to a vertical plane, so that when bottle 12 is set on a support surface 48 (via cap 24), front portion 30 and rear portion 36 are tilted slightly upward to improve readability of label 22. This easy-read tilting feature is enabled by the size, shape, and position of side portions 32, relative to front portion 30 and rear portion 36 of container 20.

In one embodiment, as shown in FIG. 1, side portions 32 of container 20 are generally trapezoidally shaped, being interposed between front portion 30 and rear portion 36. Each side portion 32 has a top section 32A positioned adjacent and joined to spine portion 34 of container 20, a top of front portion 30 of container 20, and a top of rear portion 36 of container 20. Each side portion 32 also has a base section 32B positioned adjacent and joined to mouth 38 of container 20, a bottom of front portion 30 of container 20, and a bottom of rear portion 36 of container 20. In one embodiment, base section 32B of each side portion 32 is relatively longer from front portion 30 to rear portion 36 than a length of top section 32A of each side portion 32, thereby producing the easy-read tilt feature of bottle 12. In one embodiment, the relative length between top section 32A and base section 32B is selected to produce a desired degree of tilt. Accordingly, the generally trapezoidal shape of side portions 32 and the resultant degree of tilt contributes to the easy-read tilt feature of front portion 30 and rear portion 36 of container 20.

In one example, as shown in FIG. 1, the relatively broad nature of substantially planar surfaces 50 of front portion 30 and rear portion 36 of container 20 enable a bottle 12 to be set down on its side (i.e., not on cap 24 or spine portion 34) onto support surface 48 without bottle 12 rolling along support surface 48. In particular, the breadth and relative flatness of front portion 30 or rear portion 36 prevent rolling of bottles 12 when either one of those front portion 30 or rear portion 36 are placed directly on support surface 48.

Bottle 12 comprises multiple distinct profiles, depending upon the view taken of bottle 12, with each profile uniquely enhancing a patient's experience with bottle 12. In a first view, in which a consumer directly faces front portion 30 or rear portion 36 of container 20, bottle 12 has a wide profile and generally flat, rectangular appearance primarily of substantially planar surface 50 of the corresponding one of front portion 30 and rear portion 36. In a second view, in which a consumer directly faces either one of side portions 32 of container 20, bottle 12 has a narrow profile and a generally flat, trapezoidal appearance (or generally cone-shaped appearance). Bottle 12 also includes at least one more distinct profile that is seen when directly facing spine portion 34, which reveals a relatively narrow profile. The combination of these three distinct profiles presents a radically different pharmacy bottle, with the distinct profiles contributing to the enhanced presentation of prescription-related information to the patient, as well as handling, storage, and retrieval of the bottle, as further described throughout this application.

In one embodiment, front portion 30 and rear portion 36 are generally symmetric with each other regarding a size and general shape (e.g., substantially rectangularly shaped) and side portions 32 are generally symmetric with each other regarding a size and general shape (e.g., substantially trapezoidaly shaped). In another embodiment, front portion 30 and rear portion 36 are generally asymmetric with each other regarding a size or a general shape and side portions 32 are generally asymmetric with each other regarding a size or a general shape.

In one embodiment, such as where container 20 is configured to hold medication 54 in storage chamber 40, each bottle 12 comprises a ring 56. Ring 56 encircles a portion of threaded neck 44 and, in one example, includes a color component for uniquely distinguishing between different bottles 12. In one embodiment, one color ring 56 represents a first type of medication while a second color ring 56 represents a second type of medication. In another embodiment, one color ring 56 represents a first member of a patient's family while a second, different colored ring 56 represents a second member of the same patient's family. Additional uniquely colored rings 56 can represent additional types of medication or additional family members, respectively. In another embodiment, different colored rings 56 represent other parameters useful for uniquely identifying each single bottle among a plurality of bottles 12. In another embodiment, ring 56 is not mounted to bottle 12 for using color differentiation via ring 56. In another embodiment, ring 56 is removably mounted to bottle 12 but comprises a neutral color that does not differentiate between different bottles, such as the color of container 20. Accordingly, ring 56 further contributes to easy-to-follow presentation of information to the patient and others.

Figure 2:
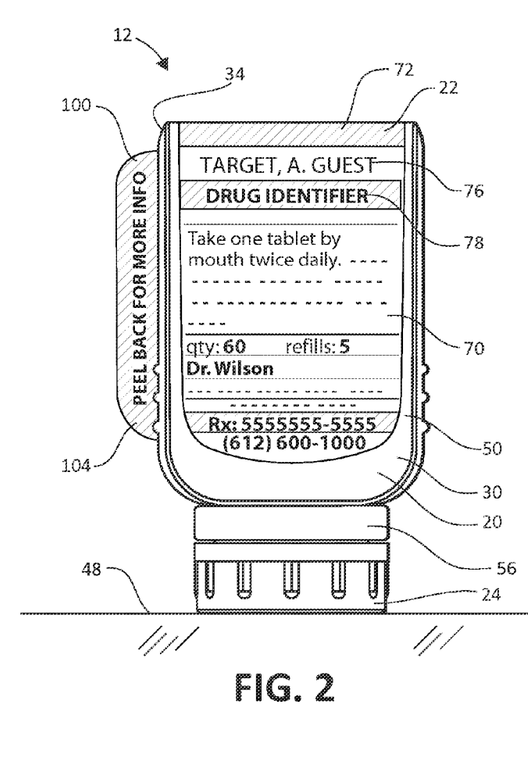
FIG. 2 is a front view illustration of a pharmacy bottle with label, according to one embodiment of the invention.
Figure 3:
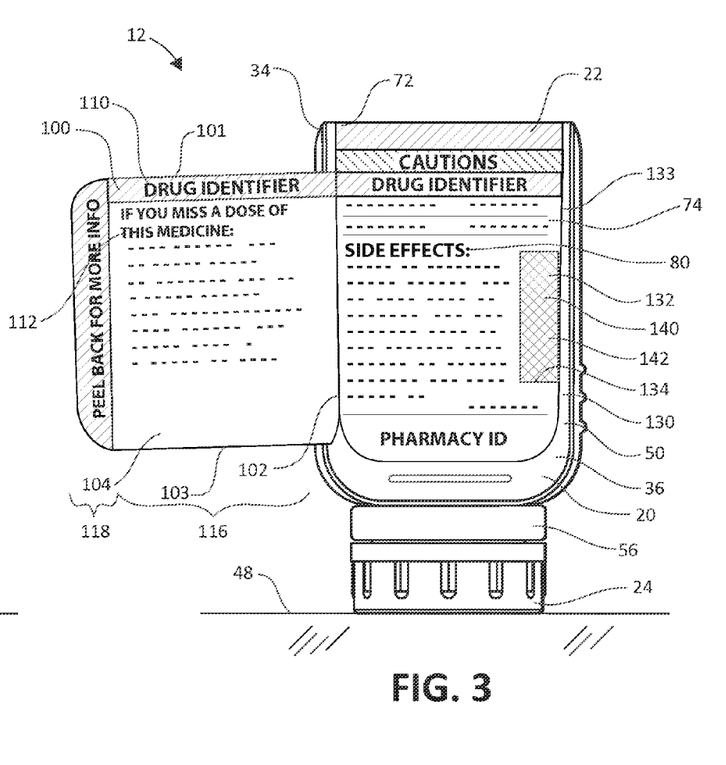
FIG. 3 is a rear view illustration of the pharmacy bottle with label of FIG. 2, according to one embodiment of the invention.

As shown in FIGS. 1-3, label 22 is adhesively secured to container 20. Label 22 comprises a mechanism to display all prescription related information on a face (e.g., a substantially planar surface 50) of bottle 12, including patient information, drug information, physician information, retail pharmacy information, etc. which is strategically distributed along label 22. More specifically, in one example, label 22 is substantially elongated defining a front panel or front portion 70, a spine portion 72 extending from an edge of front portion 70, and a rear panel or rear portion 74 extending from an edge of spine portion 72 opposite front portion 70. One or more of front portion 70, spine portion 72, and rear portion 74 of label 22 each define an interior surface configured to be adhered to front portion 30, spine portion 34, and rear portion 36 of container 20, respectively. In one embodiment, front portion 70, spine portion 72, and rear portion 74 are contiguously formed of a common piece of material. Front portion 70, spine portion 72, and rear portion 74 of label 22 each define an exterior surface include indicia and other items configured to be viewed while label 22 is coupled with container 20.

Figure 4:
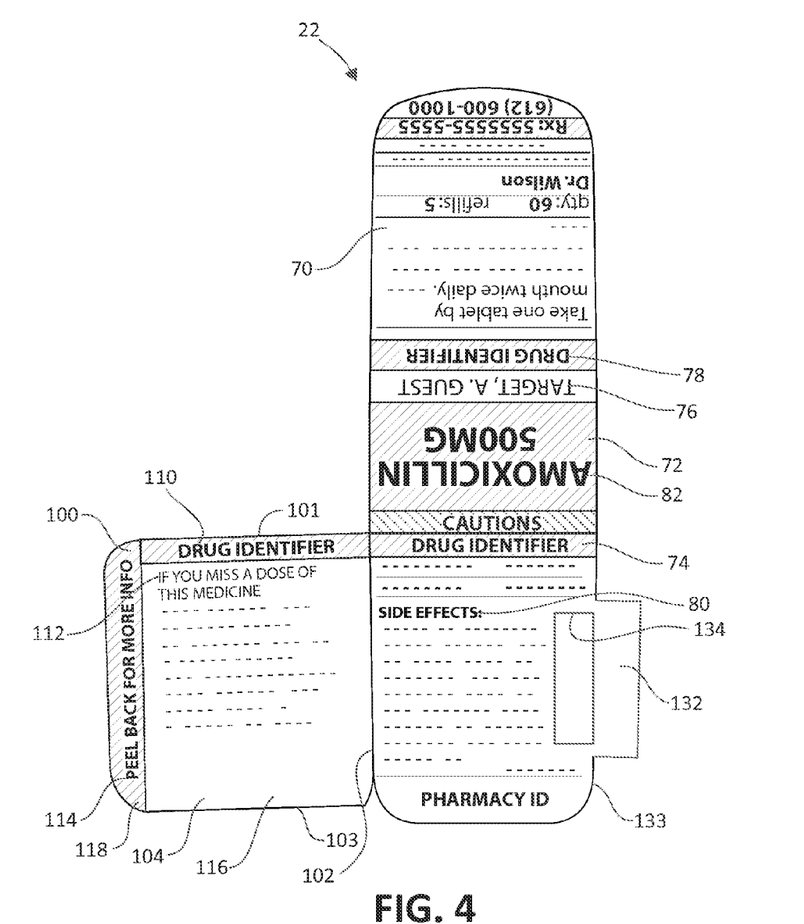
FIG. 4 is a front view illustration of a label similar to that shown in FIGS. 2 and 3, according to one embodiment of the invention.

In addition to the benefits of the placement and orientation of label 22 on the various surfaces of container 20, label 22 includes additional features. In one embodiment, front portion 70 of label 22 comprises, among other things, a patient identifier 76 and a drug identifier 78 while rear portion 74 comprises warnings, side effects, etc. 80. In one example, spine portion 72 comprises a patient identifier or drug identifier 82, as shown in FIGS. 1 and 4.

The segregation of the different types of information onto different portions of label 22, and therefore onto different portions of bottle 12, contribute to patient readability of pharmacy bottle 12. In one embodiment, front portion 70, spine portion 72, and rear portion 74 of label 22 directly correspond to front portion 30, spine portion 34, and rear portion 36 of container 20, respectively, to cause viewing of each type of information on bottle 12 on a separate face of bottle 12. In addition, front portion 70, spine portion 72, and rear portion 74 of label 22 present three different readable faces of bottle 12 that are generally perpendicular to each other.

When label 22 is applied to container 20, front portion 70 and rear portion 74 of label 22 face in opposite directions relative to bottle 12, and hence are at a substantially 180 degree angle relative to each other. Accordingly, in one embodiment, container 20 presents a three-faced container 20 (i.e., front portion 30, spine portion 34, and rear portion 36), with each face being substantially perpendicular to each other so that in coordination with the three distinct portions of label 22 (e.g., front portion 70, spine portion 72, and rear portions 66), bottle 12 provides three distinct, highly segregated reading surfaces for the patient.

The segregated reading surfaces and the orientations of front portion 30 and rear portion 36 enhance separation of prescription-related information onto different areas of bottle 12. Moreover, once a pharmacist or retailer designates one of the faces (e.g., substantially planar surface 50 of rear portion 36) of container 20 for a particular type of information (e.g., warning), the patient can rely on the same type of information being presented at that location of bottle 12 whenever a prescription is filled from that pharmacist or retailer. This feature reduces patient confusion, since a patient no longer has to search over the face of a conventional pharmacy bottle to determine where each piece of information is located in order to be able to coherently read the information on the pharmacy bottle.

In addition, in another embodiment, label 22 includes additional features for segregating information to ease patient readability of bottle 12. For example, as seen in FIG. 1, front portion 70 of label 22 includes drug identifier 78 (e.g., a drug identifier such as "AMOXICILLIN") that is presented in a large font, substantially larger than a font on other sections of front portion 70 to facilitate quick differentiation of one pharmacy bottle 12 relative to other pharmacy bottles 12. In one embodiment, as shown in FIGS. 1 and 2, drug identifier 78 is also configured in a bold font, in contrast to a normal font for other information on front portion 70 of label 22. In another embodiment, drug identifier 78 additionally comprises a colored text or a background having a color or grey-level intensity (e.g., grey shading) that is different than a color or shading of a background of other information (e.g., white) on front portion 70 of label 22 to further distinguish drug identifier 78 on front portion 70 of label 22. Such colored text or backgrounds are indicated with shading in FIGS. 1-8 for illustrative purposes.

In one embodiment, spine portion 72 of label 22 is blank to provide a more simplified label 22 that relieves the patient from having to view too much information. In another embodiment, spine portion 72 of label 22 comprises patient identifier and/or drug identifier 82 in a prominently displayed, large font, as further illustrated, for example, in association with FIGS. 1 and 4. This feature enables easy differentiation of one pharmacy bottle 12 from another based on a type of prescription or patient identity when viewing bottle 12 from a viewing angle on spine portion 34, particularly where viewing front portion 70 or rear portion 74 of label 22 is not possible or less convenient to the patient.

Rear portion 74 of label 22 comprises warnings, side effects, etc. 80 extending horizontally across rear portion 74 in a stacked, substantially parallel arrangement. Other arrangements of information on label 22 that provide for information segregation, etc. will be apparent to those of skill in the art upon reading this application.

As illustrated in FIGS. 1-4, label 22 defines a flap or tab 100. Tab 100 extends transversely from an elongated side edge of one of front portion 70 and rear portion 74. For example, as illustrated in FIGS. 1-4, rear portion 74 defines a first side edge 102 and an opposite, second side edge 133 with tab 100 extending from first side edge 102 of rear portion 74. The edge (e.g., a third edge) of rear portion 74 adjacent spine portion 72 transversely extends between the first side edge and the second side edge of rear portion 74. In one example, tab 100 has a length in the up-and-down direction between two opposing, free lateral edges 101 and 103 as illustrated in FIGS. 1-4 equal to at least 60%, and in one embodiment, at least 70% of a length of rear portion 74. In one embodiment, tab 100 has a width in the side-to-side direction of FIGS. 1-4 that is greater than a corresponding width of rear portion 74 as will be further described below. Tab 100 is configured to be folded about first side edge 102 of rear portion 74 (i.e., the boundary line between tab 100 and rear portion 74) to selectively cover rear portion 74.

Tab 100 freely extends from first side edge 102 and, in one example, is not configured to be otherwise adhered or applied to container 20 except as specifically described below. As such, tab 100 provides two additional substantially planar surface areas 104 and 106 on either side thereof. In one embodiment, substantially planar surface areas 104 and 106 include an additional drug identifier 110, additional warning information 112, and instructional indicia 114 (e.g., "peel back for more info"). In one example, each substantially planar surface area 104 and 106 defines two sections, more specifically, a first section 116 and a second section 118. First section 116 is sized to have a width similar to a width of rear portion 74 and extends outwardly from first side edge 102.

Second section extends 118 further outwardly from an edge of first section 116 opposite first side edge 102. When tab 100 is folded about first side edge 102 into a closed position extending over rear portion 74, as generally indicated by rotational arrow 120 in FIG. 1, second section 118 is configured to extend beyond the opposite edge of rear portion 74 of label 22 and, in one example, beyond a corresponding opposite edge of rear portion 36 of container 20 (see, e.g., FIGS. 1 and 2). In this arrangement, second section 118 is viewable even from a front of container 20 (see FIG. 2). Second section 118 of the substantially planar surface areas 104 and 106 alerts the consumer as to the presence of tab 100 and the additional information stored thereon and below tab 100 on rear portion 74 of label 22. Since tab 100 is physically connected, and remains connected, to container 20 when label 22 is applied thereto, tab 100, unlike separately formed information cards, etc., is able to include information required by law to be included on container 20.

In one embodiment, it is desired to be able to selectively maintain tab 100 in a closed position, folded to extend over rear portion 74 as generally illustrated in FIGS. 1 and 2. In one example, an adhesive closure 130 is defined by label 22 itself. More specifically, a relatively narrow stub or flange 132 of label 22 is defined to extend outwardly (i.e., in a direction away from tab 100) from second side edge 133 of rear portion 74 opposite tab 100 (e.g., opposite boundary line 122 and/or the opposing side edge of rear portion 74). Flange 132 is relatively long and, in one embodiment, extends along at least 50% of a length of rear portion 74. Rear portion 74 defines an aperture 134 positioned to correspond with the position of flange 132. For instance, in one example, aperture 134 is formed of a slightly shorter length and width than flange 132 and is positioned to extend inwardly from edge 132 of rear portion 74. In one embodiment, front portion 70, tab 100, and flange 132 are contiguously formed of a common piece of material. In one embodiment, aperture 134 is originally formed in a manner entirely surrounded by other portions of label 22 (see, e.g., FIGS. 4, 5, and 6).

Upon forming label 22, interior or rear, substantially planar surfaces (not shown) of at least front portion 70, rear portion 74, and flange 132 are coated in adhesive 140. As such, before attaching label 22 to container 20, flange 132 is folded rearwardly about second side edge 133 of rear portion 74 to mate adhesive 140 on a rear surface 142 of flange 132 with adhesive 140 on a rear surface (not shown) of rear portion 74. When so folded, a portion of rear surface 142 of flange 132 coated with adhesive 140 is exposed through aperture 134 of rear portion 74 as illustrated with cross hatching in FIG. 3. As such, adhesive 140 on the interior surface of flange 132 faces rearwardly and is viewable simultaneously with any writing on rear portion 74 of label 22. While adhesive 140 is configured to securely hold label 22 on container 20, adhesive 140 is also configured to selectively interact with a portion of substantially planar surface area 104 of tab 100 to hold tab 100 in the closed or folded position. In one example, adhesive 140 is selected to hold and release tab 100 upon application of a removal force thereto through a series of at least about ten open/close iterations.

Figure 5:
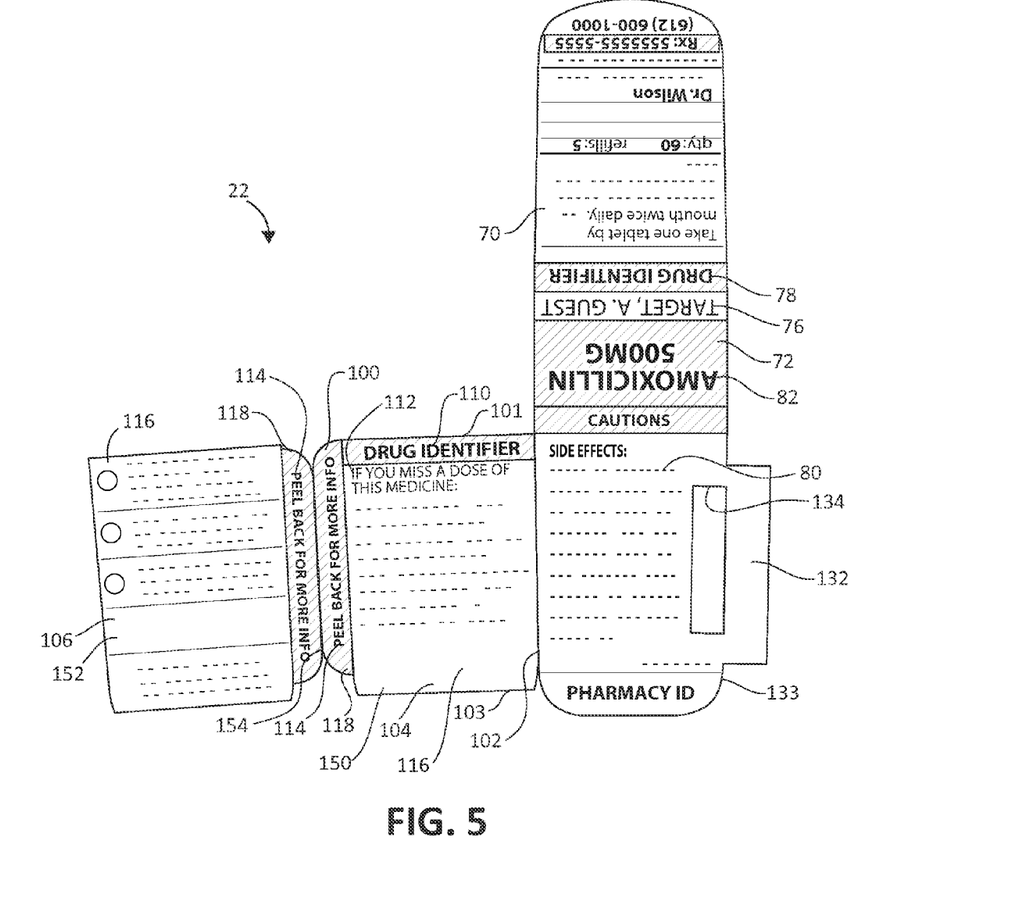
FIG. 5 is a front view illustration of a label, according to one embodiment of the invention.

As generally illustrated in FIGS. 1-4, tab 100 includes substantially planar surface areas 104 and 106 opposite one another. This configuration may be achieved by printing to both sides of tab 100. In one embodiment, as illustrated in FIG. 5, instead of printing to both sides of tab 100, tab 100 is formed with two adjacent tab members 150 and 152 joined to one another along boundary line 154. First tab member 150 defines substantially planar surface area 104, and second tab member 152 defines substantially planar surface 106 both initially on an exterior or front side of label 22. In one example, the size and shape of tab members 150 and 152 are substantially symmetrical about boundary line 154. In this embodiment, adhesive is applied to the entire interior or rear surface (not shown) of label 22 (or at least to front portion 70, rear portion 74 and to one of tab members 150 and 152). Second tab member 152 is folded rearwardly about boundary line 154 and onto first tab member 150 adhering the rear surfaces of first tab member 150 and second tab member 152 to one another. The resultant tab 100 includes writing on both sides thereof. Other methods of printing or otherwise forming tab 100 with printing on both of the two substantially planar surface areas 104 and 106 will be apparent to those of skill in the art upon reading this application.

Figure 6:
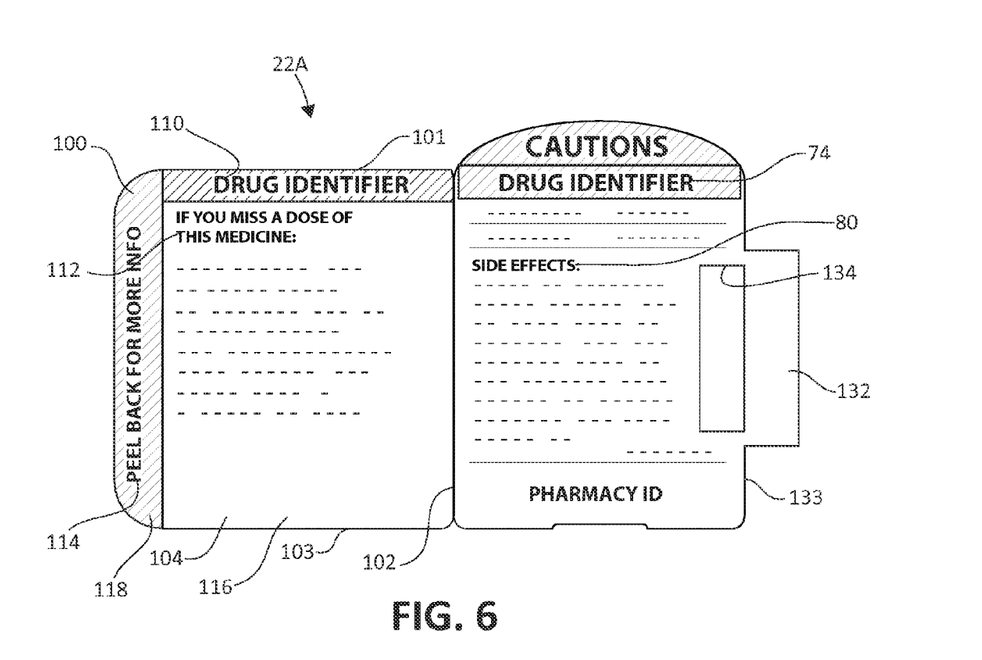
FIG. 6 is a front view illustration of a label, according to one embodiment of the invention.
Figure 7:
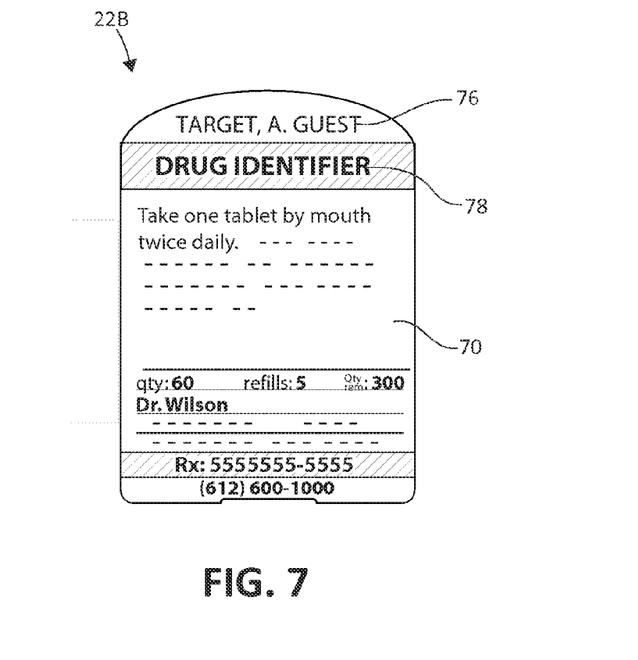
FIG. 7 is a front view illustration of a label, according to one embodiment of the invention.

FIGS. 6 and 7 indicate an alteration to label 22 of FIGS. 1-4 for larger containers 20 and/or containers 20 where it is undesired to have any label on spine portion 34. In the illustrated embodiment, two labels—a front label 22B and a rear label 22A are provided and spine portion 34 is eliminated. More specifically, front label 22B includes front portion 70 similar to label 22 (FIGS. 1-4), and rear label 22A includes rear portion 74, tab 100, and flange 132 similar to label 22. As such, front label 22B is configured to be applied to front portion 30 and rear label 22A is configured to be applied to rear portion 36 or similar portions of other containers.

Figure 8:
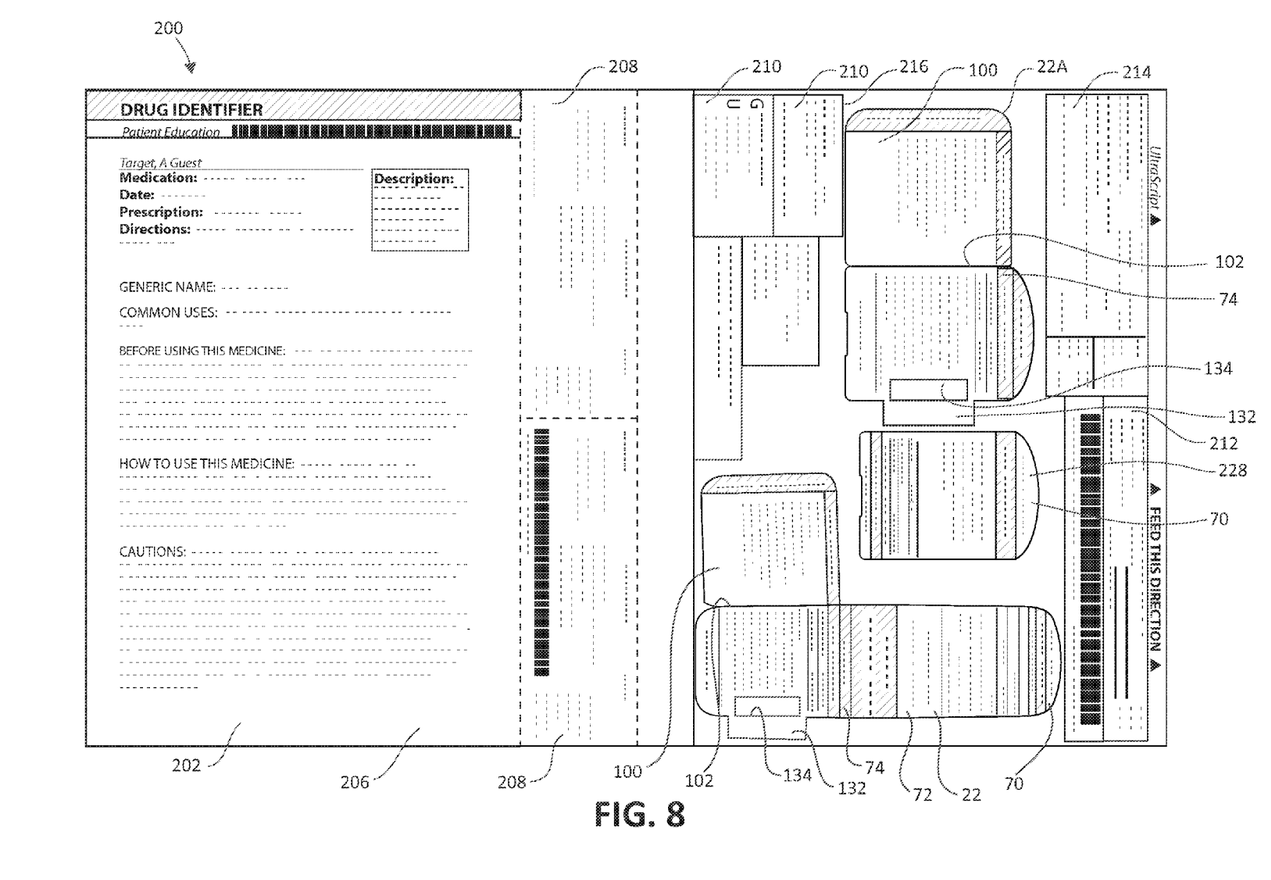
FIG. 8 is a front view illustration of a label sheet including at least one label and auxiliary items, according to one embodiment of the invention.

FIG. 8 illustrates a label sheet 200 printed for use to fill a consumer's prescription. In one embodiment, label sheets 200 are initially provided to the pharmacy as a blank form with very little, if any, of the text shown in FIG. 8 included, but with the various portions shown defined by at least perforation or other lines of indication. As such, a pharmacist or other pharmacy employee is able to feed the blank label sheet 200 into a printer programmed or coupled with a processor configured to instruct the printer to print the proper text, etc. to the predefined portions of label sheet 200 to produce the resultant label sheet 200 as shown, for example, in FIG. 8. In one embodiment, blank label sheet 200 defines various shaded, perforated, or otherwise defined areas consistent with various features of the innovation described herein.

In one embodiment, each label sheet 200 includes label 22 as illustrated in FIGS. 2-4 and labels 22A and 22B of FIGS. 6 and 7. All of labels 22, 22A and 22B will be printed. Following printing, the pharmacist or pharmacy employee is free to use the label 22 or labels 22A and 22B that she finds most suitable for the particular container 20 being used to fill the prescription.

Label sheet 200 includes many pieces configured for use in filling a prescription to meet statutory and other regulations, to inform the consumer, to facilitate filing and prescription tracking, etc. Such pieces may be arranged in any suitable arrangement to fit special and content needs, etc. For example, as illustrated, one side of label sheet 200 defines an information sheet 206 with details regarding the medication, use, possible side effects, dosage, etc. and is configured to be provided to the consumer with the prescription as a source of information regarding the prescription that may not otherwise be provided on label 22.

In one embodiment, label sheet 200 additionally or alternatively includes one or more of receipts 208, bag/box labels 210, a record of refill 212, a filing sticker 214, etc., each separated by perforation lines 216 to be easily separated from one another and used for their desired purpose. Receipts 208 are configured to be provided to the consumer, insurance company, other entity, and/or used for filing purposes as desired by the particular pharmacy. In one embodiment, receipts 208 include information such as one or more of a guest identifier, a pharmacy identifier, pharmacy contact information, a prescription number, a name of the prescribing doctor, refill information, quantity information, and an amount due by the patient for the prescription.

Bag label 210 includes retail-sorting information and is removable for adhesive placement on a retail bag for identifying the bag with a particular patient and prescription. In one example, bag label 210 includes sorting indicia, a guest identifier, a prescription identifier, a prescription number, and/or pharmacy contact information. Refill label 212 includes retail information relating to processing refill prescriptions. In one embodiment, refill label 212 indicates details regarding a refill, if applicable, including whether the consumer is enrolled in an associated automated refill program, an invitation to enroll in an associated automated refill program, any refills remain, and/or other notes that the pharmacy wishes to communicate to the consumer and/or the pharmacy employees.

File sticker 214 is attached to the prescription ticket being filled and is configured to be kept on file for a length of time, such as a length of time required by government regulations and/or pharmacy policy. In one embodiment, file sticker 214 includes one or more of a guest identifier, a prescription identifier, a prescription number, a pharmacy identifier, pharmacy contact information, a color assigned to the prescription or patient, refill information, directions for prescription use, and cost information. Other items for inclusion on label sheet 200, e.g., units-of-use labels, will be apparent to those of skill in the art upon reading the present application.

Figure 9:
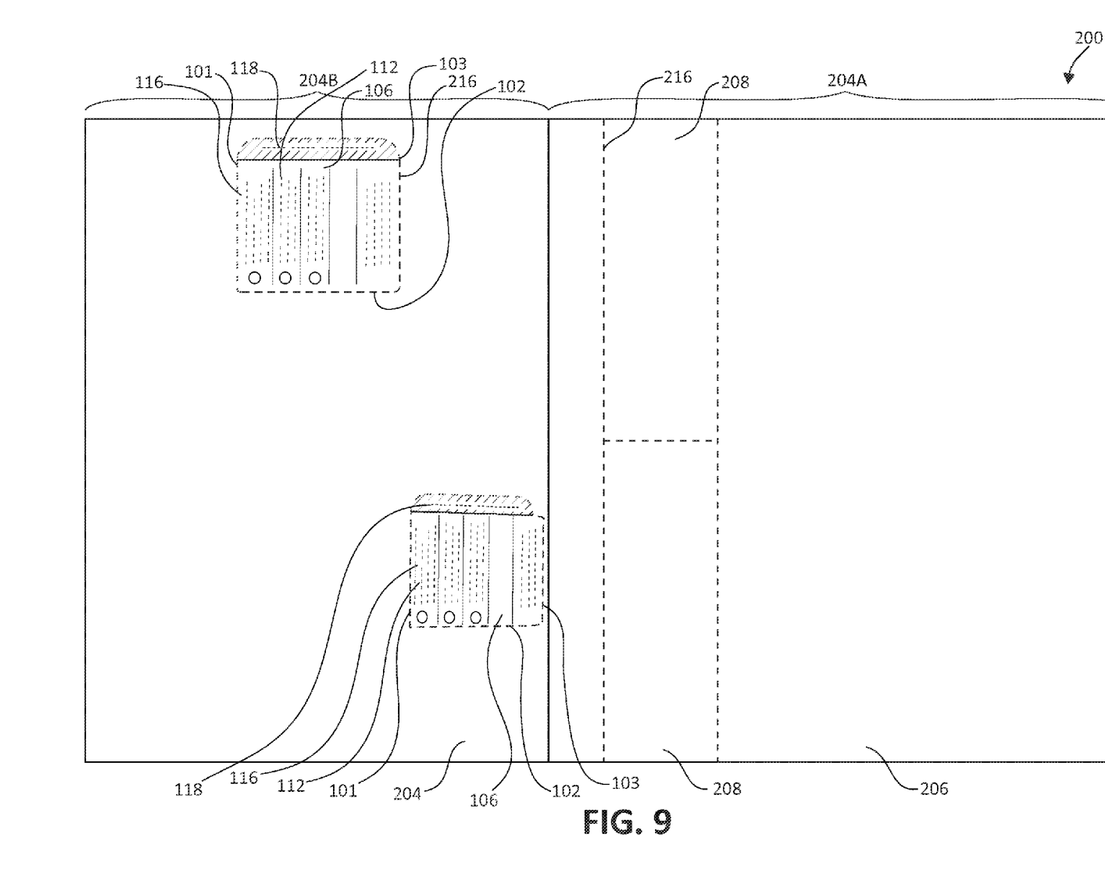
FIG. 9 is a rear view illustration of the label sheet of FIG. 8, according to one embodiment of the invention.

In one example, label sheet 200 includes an exterior or front surface 202 (FIG. 8) and a rear surface 204 (FIG. 9) opposite front surface 202. FIG. 9 illustrates one example of a rear view of label sheet 200 of FIG. 8, according to one embodiment of the present invention. The following description is provided with additional reference to the schematic view illustration of FIG. 10. Label sheet 200 is generally formed with a first sheet of paper 230, coated with adhesive on a first side thereof, and a paper liner 234 coated with a suitable release agent such as silicon 232. The layers of label sheet 200 are rolled together under compression. Silicon 232 allows paper 230 with adhesive 140 to be removed from paper liner 234 with relative ease, such that paper 234 with adhesive 140 removed from paper liner 234 serves as the adhesive label portion.

Figure 10:
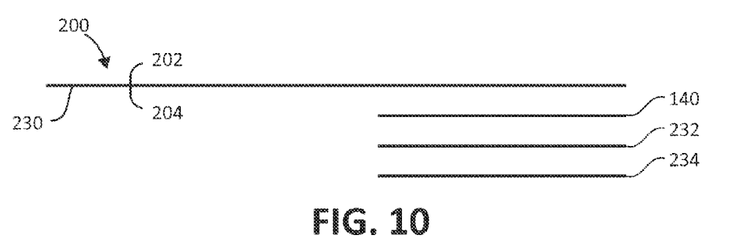
FIG. 10 is an exploded schematic side view illustration of the label sheet of FIG. 8, according to one embodiment of the invention.

As illustrated, front surface 202 of label sheet 200 is entirely formed by paper 230 (e.g., FIG. 10). Rear surface 204 is partially formed by paper 230 at first section 204A of label sheet 200, which is not coated with adhesive 140, silicon layer 232, or paper liner 234. A second section 204A of rear surface 204 is defined by paper liner 234, where second section 204A includes adhesive 250 and liner paper 234. Portions of label sheet 200 positioned in second section 204B will generally be configured for use as adhesive labels or stickers, while portions of label sheet 200 positioned in first section 204A are generally not configured for adhesive use. In one embodiment, information sheet 206 and receipts 208 are included in first section 204A and are not adhesively backed while the remaining components of label sheet 22 are formed on the adhesive second section 204B.

In one embodiment, while most features on second section 204B are configured to be peeled from liner paper 234 and silicon layer 232 for use as an adhesively backed label, tab 100 is configured to be punched or otherwise removed from label sheet 200 including both paper 230 and liner paper 234 such that paper 230 defines first substantially planar surface area 104 and liner paper 234 defines an opposite, second substantially planar surface area 106 of tab 100. In this manner, in preparing label 22 for use, label sheet 200 is placed into the aforementioned printer for dual-side printing either in one pass or two passes depending upon the capabilities of the printer. In the conventional label sheet printing, the only printing done on second surface 204 was completed on back of paper 230 over first section 204A of label sheet. In embodiments of the present invention, printing on second surface 204 is also completed in portions of liner paper 234 corresponding to tab 100 as illustrated in FIG. 9.

Figure 11:
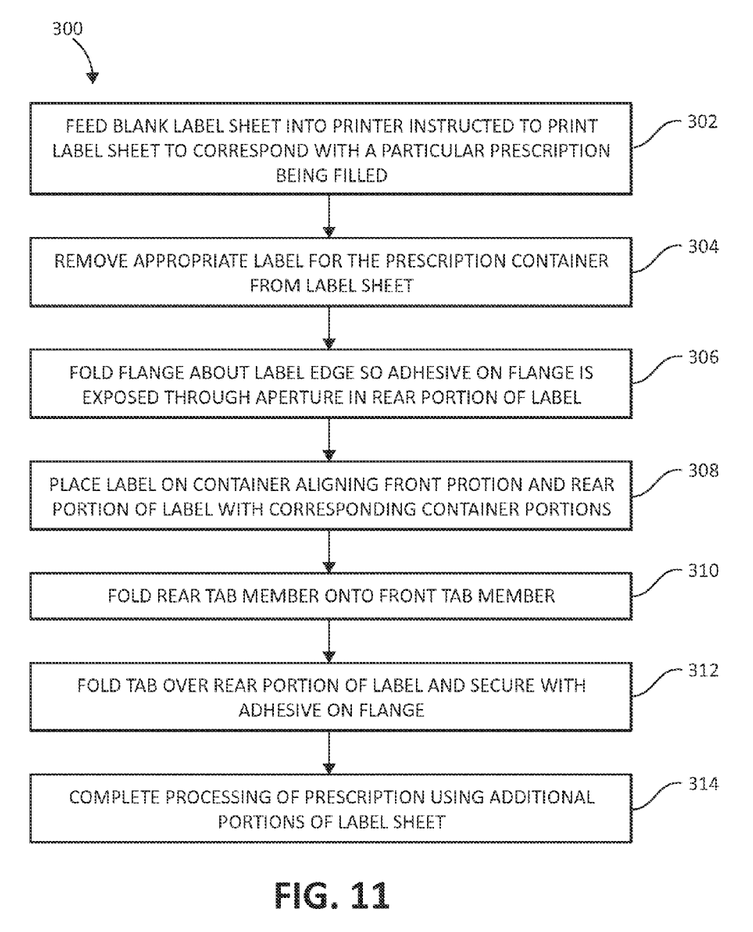
FIG. 11 is a flow chart illustrating a method of using the label, according to one embodiment of the invention.

FIG. 11 illustrates a method 300 of using pharmacy bottle system 10 to fill a prescription, according to one embodiment of the present invention. At 302, a pharmacist or technician enters or recalls patient and prescription information into a computer control module (via a graphical user interface) and then directs printing of that information onto label sheet 200, which is fed or has already been fed into the associated printer. A hardware processor then prints the appropriate portions of an first, exterior, or front surface 202 and second, interior, or rear surface 204 of label sheet 200, including both paper 230 and paper liner 234, with information relating to the particular prescription being filed in the particular sections of label sheet 200 described above and/or other suitable sections. In one embodiment, one or both of front surface 202 and rear surface 204 is substantially planar.

At 304, the selected one of label 22 (FIGS. 2-5) or labels 22A and 22B (FIGS. 6 and 7) is removed from a remainder of label sheet 200. For example, for small containers 20 or containers 20 with appropriate spine portions 72, label 22 is generally selected while labels 22A and 22B are selected for larger bottles or bottles with inappropriate spine portions 72, etc. At 306, flange 132 of the selected label 22 or label 22A is folded rearwardly about second side edge 133 of label 22 or 22A adhering flange 132 to a rear surface of rear portion 74 such that adhesive 140 on rear surface of flange 132 is exposed via aperture 134, as shown, for example, with reference to FIG. 3.

At 308, selected label 22 or labels 22A and 22B are placed on the corresponding container 20 such that front portion 70 and rear portion 74 of label overlay and are adhered to front portion 30 and rear portion 36 of container 20. At 310, if label 22 similar to that of FIG. 5 is used, then rear tab member 152 is folded about boundary line 154 to adhere to rear surface of front tab member 150 to define tab 100 with dual-sided printing. However, in embodiments similar to that of FIG. 4, tab 100 is initially printed on both sides and the two members do not exist. In those embodiments, operation 310 is eliminated.

At 312, tab 100 is folded along first side edge 102 to extend over rear portion 74 of label 22 or label 22A to interface with the exposed adhesive 140 of flange 132 through aperture 134 such that tab 100 is selectively held in place folded over rear portion 74. Adhesive 140 is configured such that tab 100 can easily released and folded away from rear portion 74 upon an exertion of minimal force on tab 100 by the consumer. Then, at 314, the pharmacist or technician completes processing of the prescription using the other appropriate sections of label sheet 200, bagging container 22 for delivery to consumer, etc.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A label comprising:
   a panel defining a first side edge, a second side edge opposite the first side edge, and an aperture extending through the panel and positioned adjacent the second side edge;
   a tab extending from the first side edge away from the panel, wherein the tab is configured to rotate about the first side edge to selectively move between a first position, in which the tab substantially covers the panel, and a second position, in which the tab extends away from the panel; and
   a flange initially formed to extend from the second side edge away from the panel, wherein the flange defines a substantially planar surface coated with an adhesive, and the flange is folded about the second side edge to extend behind the panel such that the adhesive coated on the substantially planar surface of the flange extends across and is exposed through the aperture of the panel.

2. The label of claim 1, wherein the panel, the tab, and the flange are all formed of a common piece of a material sheet.

3. The label of claim 2, wherein the material sheet is layered to include a paper layer, an adhesive layer including the adhesive, and a liner layer.

4. The label of claim 1, wherein:
   the panel defines a first substantially planar surface extending between the first side edge and the second side edge of the panel and a second substantially planar surface extending between the first side edge and the second side edge of the panel opposite the first substantially planar surface,
   the second substantially planar surface of the panel is coated with the adhesive and is substantially contiguous with the substantially planar surface of the flange that is coated with the adhesive, and
   the substantially planar surface of the flange is adhered to the second substantially planar surface of the panel.

5. The label of claim 1, wherein when the tab is in the first position, the tab interacts with the adhesive coated on the substantially planar surface of the flange that is exposed via the aperture of the panel to selectively secure the tab in the first position.

6. The label of claim 1, wherein the tab defines an interior, substantially planar surface and an opposite exterior, substantially planar surface each printed with information regarding a prescription.

7. The label of claim 6, wherein:
   the panel defines a first substantially planar surface, which extends between the first side edge and the second side edge of the panel, and a second substantially planar surface, which is opposite the first substantially planar surface and extends between the first side edge and the second side edge of the panel,
   the first substantially planar surface of the panel includes indicia regarding the prescription,
   the flange is adhered behind the second substantially planar surface of the panel, and
   the interior, substantially planar surface of the tab extends directly over the first substantially planar surface of the panel when the tab is in the first position.

8. The label of claim 1, wherein the panel is a first panel, and the label further comprises:
   a second panel configured to be applied to an opposite side of a bottle as compared to the first panel and including indicia regarding contents of the bottle.

9. The label of claim 8, wherein the first panel defines a third edge transversely extending between the first edge and the second edge of the first panel, and the label further comprises:
   a spine portion extending from the third edge of the first panel to an edge of the second panel such that the first panel, the spine portion, and the second panel are contiguously formed of a single sheet of material, and the spine portion is configured to extend over one of a first side, a second side, a top, and a bottom of the bottle.

10. The label of claim 9, in combination with the bottle, wherein:
    the bottle defines the first side, the second side opposite the first side, the top, the bottom, and a side wall,
    each of the top, the bottom, and the side wall extend between the first side and the second side of the bottle,
    the first panel is adhered to the first side of the bottle,
    the second panel is adhered to the second side of the bottle, and
    the spine portion extends over one of the top, the bottom, and the side wall of the bottle.

11. The label of claim 1, in combination with a container defining an exterior surface, wherein the panel is adhered to the exterior surface of the container such that the flange is positioned between the panel and the exterior surface of the container.

12. The combination of claim 11, wherein a portion of the tab opposite the first side edge of the panel extends beyond an outermost edge of the container when the tab is in the first position such that the portion of the tab is visible from an opposite side of the container.

13. The combination of claim 11, further comprising a prescription medication enclosed within the container.

14. The combination of claim 13, wherein:
    the panel is a first panel,
    the exterior surface of the container defines two opposite substantially planar portions,
    the first panel is adhered to one of the two opposite substantially planar portions,
    the label includes a second panel adhered to the other one of the two opposite substantially planar portions of the container, and
    both the first panel and the second panel include indicia regarding the prescription medication.

15. The combination of claim 14, further comprising:
    a spine portion extending from a third edge of the first panel to an edge of the second panel such that the first panel, the spine portion, and the second panel are formed of a contiguous piece of material.

16. A label for a bottle, the label comprising:
    means for providing information regarding contents of the bottle, the means for providing information being configured to adhere to the bottle and defining an opening near a first side of and formed entirely through the means for providing information;
    means for providing adhesive extending across the opening, wherein the means for providing adhesive is contiguous with and folded relative to the means for providing information; and
    means for selectively covering the means for providing information configured to transition between a first position covering the means for providing information and a second position extending away from the means for providing information, wherein when the means for selectively covering is in the first position, the means for selectively covering is selectively secured in the first position by interaction between the means for selectively covering and the means for providing adhesive through the opening.

17. The label of claim 16, wherein the means for providing information and the means for providing adhesive are contiguously formed from a common piece cut from a substantially planar sheet of material.

18. The label of claim 17, wherein the substantially planar sheet of material is formed of multiple layers including a first exterior layer, an adhesive layer, and a liner layer.

19. The label of claim 17, wherein the means for selectively covering is formed by the common piece cut from the substantially planar sheet of material.

20. The label of claim 17, the means for providing information defines a second side opposite the first side, wherein:
the means for providing adhesive extends from the first side of the means for providing information, and
the means for selectively covering extends from the second side of the means for providing information.

21. The label of claim 20, wherein:
the means for providing adhesive is folded in a first direction about the first side to extend across the opening through the means for providing information; and
the means for selectively covering is folded in a second direction, opposite the first direction, to cover the means for providing information in the first position.

22. The label of claim 16, in combination with the bottle filled with a medication, wherein the label is adhered to the bottle such that the means for providing adhesive is positioned between the bottle and the means for providing information.

23. A method of labeling a container, the method comprising:
providing a sheet of material;
defining a panel, a flap extending from a first edge of the panel, and a stub extending from a second edge of the panel, wherein:
the second edge of the panel is opposite the first edge of the panel, and
at least a rear surface of the panel and a rear surface of the stub are coated with an adhesive;
defining an aperture through the panel near the second edge;
folding the stub about the second edge such that the adhesive on the rear surface of the stub is exposed through the aperture;
folding the flap about the first edge to a first position covering the panel and to interact with the adhesive on the rear surface of the stub that is exposed through the aperture, wherein interaction between the flap and the adhesive on the rear surface of the stub selectively holds the flap in the first position.

24. The method of claim 23, further comprising:
printing on both sides of the sheet of material such that at least one surface of the panel and at least two opposing surfaces of the flap are printed with indicia relating to contents of the container.

25. The method of claim 23, further comprising:
adhering the panel to an exterior surface of the container such that the stub is positioned between the panel and the exterior surface of the container.

26. The method of claim 25, further comprising:
filling the container with contents.

27. The method of claim 26, wherein the contents include a prescription medication.

* * * * *